Dec. 21, 1937.    C. L. EKSERGIAN    2,103,201
VEHICLE WHEEL
Filed May 1, 1934
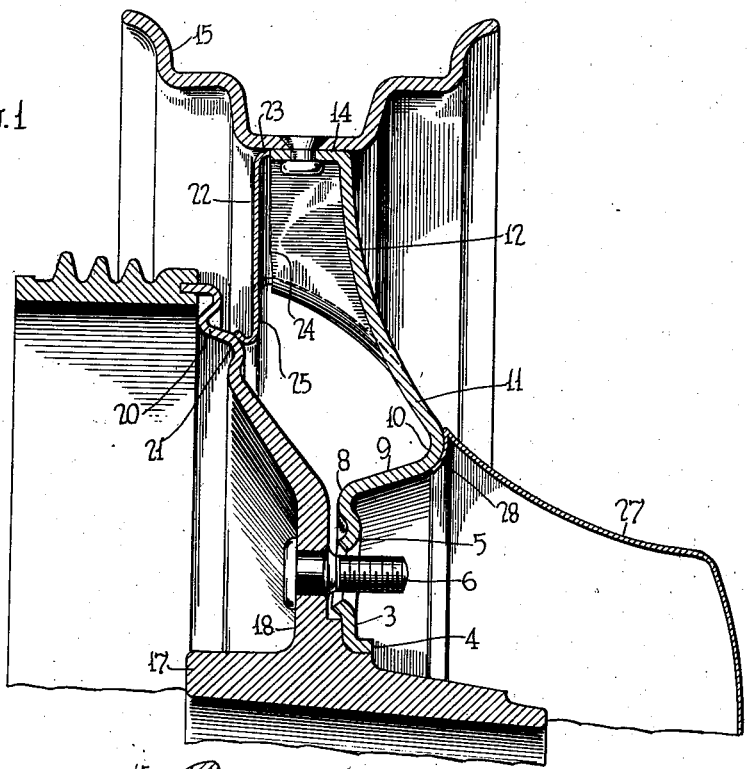
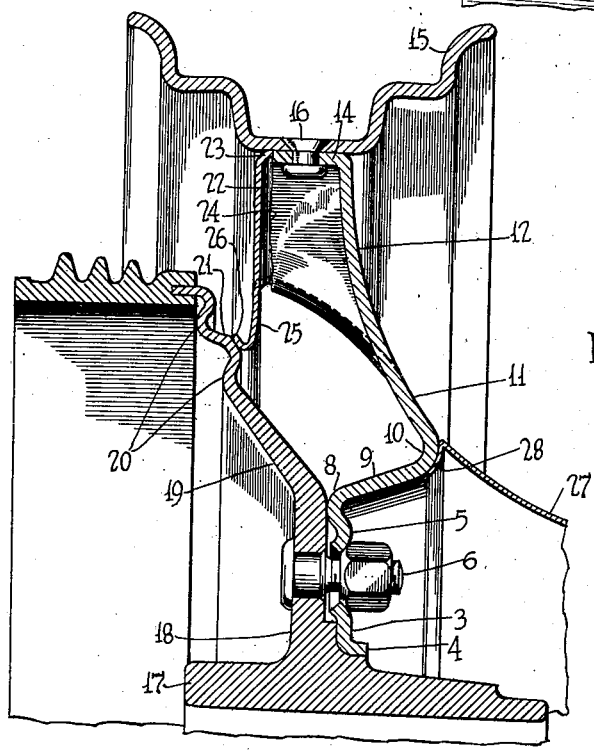
INVENTOR.
CAROLUS L. EKSERGIAN.
BY John P. Tarbox
ATTORNEY.

Patented Dec. 21, 1937

2,103,201

UNITED STATES PATENT OFFICE 2,103,201

VEHICLE WHEEL

Carolus L. Eksergian, Detroit, Mich., assignor to Budd Wheel Company, Philadelphia, Pa., a corporation of Pennsylvania Application May 1, 1934, Serial No. 723,305

9 Claims. (Cl. 301—6)

My invention relates to vehicle wheels, particularly of the artillery steel type, of hollow section, having improved means for closing such section and mounting the wheel in position.

Among the objects are to conserve space and material, decrease the weight and cost, without sacrifice of necessary strength, facilitate fabrication, assembly, welding, mounting and demounting, provide a closed seal, and render the device more effective in operation and an improvement generally in its field.

In a preferred form, a main load front spider is constituted of heavy gauge sheet metal, preferably as a one-piece stamping having a radial bolting-on flange at about the wheel load plane, and a conical portion diverging forwardly from the outer perimeter of the flange and merging through a rearwardly diverging conical body or nave into rear opening spoke portions of deep channel section having side edges and closed outer end edges in a plane rearwardly of the load plane.

A hub, of heavy metal section, includes a flange of like section merging, through a rearwardly diverging conical brake element or head of radially outwardly decreasing or taper gauge wall thickness, into a relatively thin gauge annulus of substantially sinusoidal section having a crest constituting an annular seat disposed a substantial distance radially outwardly from the outer perimeter of the hub flange, or at substantially the outer perimeter of the brake drum.

A thin gauge, preferably one-piece sheet metal, rear spider stamping, includes front opening spoke portions of shallow channel section having side and closed outer end edges flash welded to the corresponding edges of the front spider, and a radial annulus inwardly of the spoke portions having a rearwardly turned inner perimetral edge margin disposed on said seat.

In the above-mentioned construction, the demountable wheel structure or unit is therefore reduced to the extent that the brake drum head constitutes a part thereof when the wheel is mounted, this brake drum head covering a hollow section of the unit having a rear opening of substantial area, and not only thus constituting a rear seal or cover but also providing strength at the cost of no additional or new material in the wheel unit which is not already required on the vehicle, and which could hardly be advantageously made a part of the unit itself. The improvement is effected without substantial change in the brake drum as ordinarily required and permits the rear spider or spoke cover to be substantially reduced in weight.

The arrangement further lends itself to a wheel mounting or clamping feature, which is novel so far as I am aware, in which, unless the wheel unit is first mounted on the hub, it impinges the same only at the inner perimeter of the bolting-on flange and not the aforementioned annulus seat on the brake drum head. When the unit is tightened, by the usual mounting nuts, the composite spider, made up of the component front and rear spiders, is flexed to engage the outer perimeter of the bolting-on flange to the outer perimeter of the hub flange, with the annular seat on the brake drum head, as engaging the flange on the rear spider, backing the composite spider against, and to permit such flexure, and to determine the final position of the unit. The arrangement provides a very secure clamp, as well as a tight seal cover for the rear open section of the wheel.

The invention will be better understood by reference to the following description and the accompanying drawing, in which:

Figure 1 is a view, in axial section through a spoke, of a portion of a wheel embodying the invention, with the parts in a preliminary stage of mounting, before tightening the mounting nuts, and Figure 2 is a view similar to Figure 1, with the parts as finally clamped in position.

Referring to the drawing, the front or main load component spider comprises a bolting-on flange 3 having a forward axial radially inner flange 4, the usual conical seats 5 for the reception of mounting studs 6 and cooperating nuts 7, and an outer perimetral portion or seat 8 of rounded section. The latter merges, through a forwardly diverging cone or annulus 9 and about a rounded section 10, into a rearwardly diverging nave or body 11 having rear opening spoke portions 12 of deep channel cross section. Outer end closure elements 14, preferably constituting integral parts of the spoke portions 12 and suitably secured to a usual drop center rim 15, as by rivets 16, have their rear edges in a wheel plane with the rear side edges of the spokes and rearwardly of the wheel load plane adjacent to which the bolting-on flange 3 is disposed.

A hub 17, preferably of heavy metal section, has a flange 18 of like section merging, through a rearwardly diverging conical brake drum head 19 of radially outwardly decreasing thickness into an annulus 20 of substantially sinusoidal section having a crest 21 constituting an annular seat disposed a substantial distance radially outwardly of the outer perimeter 8 of the bolting-on flange 3.

A rear spider, preferably of thin gauge sheet metal and also constituting as a one-piece stamping, includes front opening component spoke portions 22 of shallow channel cross section having side edges and edges of integral outer end closure elements 23 in a wheel plane, and flash welded, as indicated by a weld seam 24, to the corresponding edges of the front spider spoke portions 12. The spoke portions 22 thus close or cover the rear open sides of the spoke portions 12 and cooperate therewith to form composite hollow or tubular spokes.

A preferably radial annulus 25 projects radially inwardly from the spoke portions 22 and has a rearwardly turned inner perimetral margin or flange 26 constituting a seal or seat for nesting or abutting impingement with the crest seat 21 on the brake drum head 19. A hub cap 27, of any suitable diameter, may be provided with a flange 28 conforming, and suitably secured, to the said section or front nose 10 of the nave 11.

As indicated in Figure 1, when the composite spider is first mounted on the hub parts, and before applying and tightening the nuts 7 on the studs 6, the inner perimetral section 4, of the bolting-on flange 3, impinges or nests a conforming angle section shoulder of the hub flange 18, and the seat 26 of the rear spider impinges the crest seat 21, but there remains a space between the outer perimetral portion 8 of the bolting-on flange 3 and the adjacent portion of the hub flange 18.

When the nuts 7 are driven home, the composite spider, or a part thereof, flexes such that the portion 8 of the bolting-on flange is moved into engagement with the hub flange 18, thus clamping the spider or wheel unit over a greater area of the hub flange to provide a more solid and substantial base, and causing tight seal impingement between the seats 21 and 26; this double function being performed by operation of the single means represented by the nuts 7 on the studs 6.

Although, specifically, the clamping movement desired may be provided through the heavy gauge parts 9, 10 and 11, with partial or no flexure thereof, and flexure of the rear annulus 25, it may be provided in equivalent manner by suitably constituting other parts, providing a structure, which broadly considered, has means, including a brake drum head, for closing a large rear opening of a hollow wheel unit, and means operating through the front and rear seats 3 and 26 which are radially separated substantial distances.

In the above described structure also, the composite spider, which may be constructed in other ways, constitutes, in effect, a body including the radial spoke portions of closed hollow section and a radially inner annulus of rear opening axial channel section, represented by the parts 9, 10, 11, 25 and 26, on the radially outer axial channel side of which is disposed the seat 26, and on the radially inner axial side of which is disposed the bolting-on flange 3; the structure shown being merely illustrative of a specific adaptation and not intended as a limitation beyond the purview of the invention.

What I claim is:

1. A wheel comprising a sheet metal front spider including a radial bolting-on flange at approximately the wheel load plane and a conical portion diverging forwardly from the outer perimeter thereof and merging through a rearwardly diverging conical nave into rearwardly opening spoke portions of deep channel cross section having side edges and closed outer end edges rearwardly of said plane, a hub including a flange merging through a rearwardly diverging conical brake drum head of radially outwardly decreasing thickness into an annulus of sinusoidal section having a crest constituting a seat disposed a substantial distance radially outwardly from said outer perimeter, and a rear spider including front opening spoke portions of shallow channel cross section having side edges and outer end edges flash welded to the corresponding edges of the front spider and a radial annulus inwardly of the spoke portions having a rearwardly turned edge margin disposed on said seat.

2. A wheel comprising a sheet metal front spider including a radial bolting-on flange and a conical portion diverging forwardly from the outer perimeter thereof and merging through a rearwardly diverging conical nave into rearwardly opening spoke portions, a hub including a flange merging through a rearwardly diverging conical brake drum head of taper gauge into an annulus of sinusoidal section having a crest constituting an outer perimetral seat, a rear spider of a thickness substantially less than that of the said front spider including spoke portions covering said front spider spoke portions and a radial annulus inwardly of the spoke portions having a rearwardly turned edge margin disposed on said seat, the spiders forming a composite spider which, when first mounted on the hub flange and brake drum head, impinges the same only at said seat and at the radially inner perimeter of the hub flange, and means for attaching the flanges to each other and flexing the composite spider to cause an outer perimetral portion of the bolting-on flange to engage the hub flange.

3. A vehicle wheel comprising a sheet metal front spider including a bolting-on flange and an annular portion projecting forwardly therefrom and connected through a conical nave portion into spoke portions, a hub including a flange merging into a brake drum element having a seat disposed a substantial distance radially outwardly from the periphery of the hub flange, and a sheet metal rear spider including spoke portions cooperating with the front spider spoke portions to form tubular spokes and an annulus, the latter disposed on said seat.

4. A vehicle wheel comprising a sheet metal front spider including a bolting-on flange and an annular portion projecting forwardly therefrom and connecting through a conical nave section into spoke portions, a hub including a flange merging into a brake drum element having a seat disposed a substantial distance radially outwardly from the hub, a sheet metal rear spider including spoke portions cooperating with the front spider spoke portions to form tubular spokes and an annulus disposed on said seat, the spiders forming a composite spider which, when first mounted on the hub flange and brake element impinges the same only at said seat and at the radially inner perimeter of the hub flange, and means for attaching the flanges to each other and flexing the composite spider to cause an outer perimetral portion of the bolting-on flange to engage the hub flange.

5. A vehicle wheel comprising a body including a radially outer portion having spokes of closed hollow section and a radially inner annulus of rearwardly opening channel cross section having its radially outer axial channel side wall constituting a seat and a bolting-on flange on its radially inner channel side wall, a hub flange for said bolting-on flange merging into a brake drum element constituting a closure for the open side of said channel section portion and providing a seat for said first seat, said body, when first mounted on the hub flange and brake drum element, impinging the same only at said seat and at the radially inner perimeter of the hub flange, and means for attaching the flanges to each other and flexing the body to cause an outer perimetral portion of the bolting-on flange to engage the hub flange.

6. A vehicle wheel comprising a body having a rear side seat and a bolting-on flange having a continuous outer perimetral portion for cooperation with a hub flange, a hub flange engaging said bolting-on flange, a brake drum element providing a seat a substantial distance radially outwardly of the bolting-on flange per se for said rear side seat fixed relative to the hub flange, the body, when first mounted on said hub flange and said fixed seat, impinging only at said fixed seat and at the radially inner perimeter of the hub flange, and means for attaching said bolting on flange and said hub flange to each other and for flexing the body to draw a continuous outer perimetral portion of said bolting-on flange into engagement with said hub flange.

7. A metal artillery wheel comprising an outer stamping consisting of spokes of inwardly facing channel cross section, a nave and a bolting-on flange having bolt holes and annularly disposed flange seats on radially opposite sides of the circle of its bolt holes, and an annularly extending closure for the spokes axially inwardly of said outer stamping, which closure is provided with annularly disposed wheel seating means disposed in spaced relation to the outer stamping and in a zone radially beyond the radially outer seating means of the bolting-on flange.

8. A metal artillery wheel according to claim 7 in which a mounting hub is provided with annularly disposed complemental wheel seating means in similar radial disposition to those provided on the wheel body, but the intermediate of which seating means is further axially inward with respect to the radially innermost hub seat than is the intermediate flange seat upon the wheel body axially inward of the radially innermost flange seat of said wheel body, whereby the innermost and outermost of said wheel seating means are engaged upon complemental seating means in advance of the intermediate such seating means, the wheel body radially inwardly removed from said closure member being adapted to be flexed to a sufficient degree to engage the intermediate seating means when the wheel is bolted in place.

9. A metal artillery wheel according to claim 7, in which the closure between the spokes is in the form of an inner spider stamping complemental to the outer stamping and together with the outer stamping forming spokes of hollow cross section and which terminates substantially in the radially outermost wheel seat aforesaid.

CAROLUS L. EKSERGIAN.